Jan. 23, 1962    T. F. HURSEN ET AL    3,017,960
WHEEL TREAD BRAKE UNIT FOR RAILWAY CAR TRUCKS
Filed Dec. 31, 1959    4 Sheets-Sheet 2

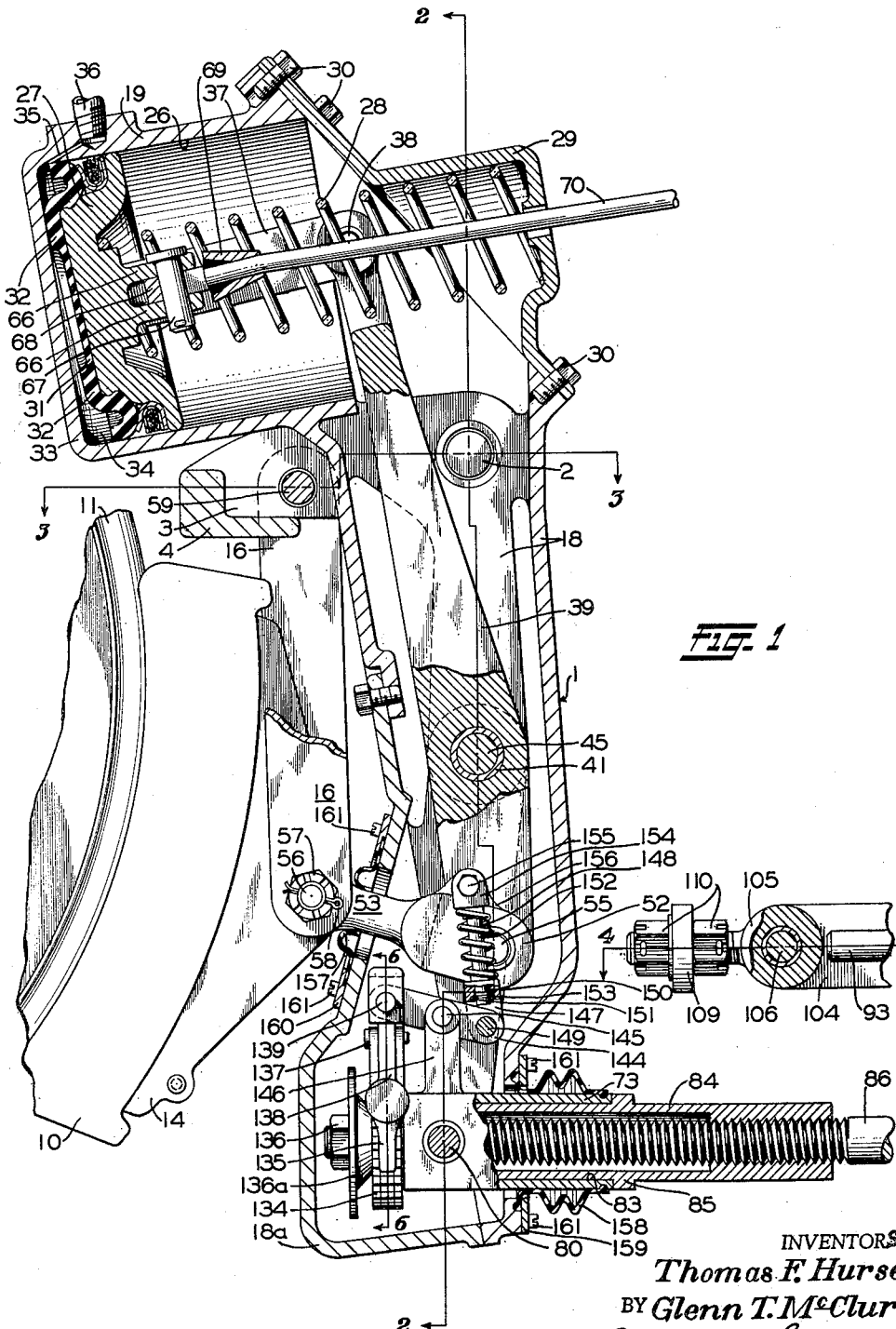

INVENTORS
Thomas F. Hursen
BY Glenn T. McClure
Attorney

Jan. 23, 1962 T. F. HURSEN ET AL 3,017,960
WHEEL TREAD BRAKE UNIT FOR RAILWAY CAR TRUCKS
Filed Dec. 31, 1959 4 Sheets-Sheet 3

INVENTORS
Thomas F. Hursen
BY Glenn T M<sup>c</sup>Clure
Adelbert A. Steinmiller
Attorney Jan. 23, 1962 T. F. HURSEN ET AL 3,017,960
WHEEL TREAD BRAKE UNIT FOR RAILWAY CAR TRUCKS
Filed Dec. 31, 1959 4 Sheets-Sheet 4

INVENTORS
*Thomas F. Hursen*
BY *Glenn T. McClure*
*Adelbert A. Steinmiller*
Attorney United States Patent Office 3,017,960
Patented Jan. 23, 1962

3,017,960
WHEEL TREAD BRAKE UNIT FOR RAILWAY
CAR TRUCKS
Thomas F. Hursen, Monroeville, and Glenn T. McClure, McKeesport, Pa., assignors to Westinghouse Air Brake Company, Wilmerding, Pa., a corporation of Pennsylvania
Filed Dec. 31, 1959, Ser. No. 863,339
9 Claims. (Cl. 188—52)

This invention relates to tread brake apparatus for railway rolling stock and more particularly to so-called "package" brake units wherein the actuating mechanism is enclosed in a unitary sectionalized casing or "package" for convenient mounting in a compact assembly and for protection against dirt, ice and water.

Recently, various types of simplified railway vehicle brake rigging, and more particularly brake apparatus and brake rigging for railway car trucks, have been devised and placed in service. One example of such types of simplified brake apparatus is a small, lightweight, compact, independently operated, pneumatic brake unit or "package" brake for each individual wheel of a railway car truck in which the brake apparatus is enclosed in a sectionalized casing or housing attached, as by bolts and nuts or by welding, to a side frame of the car truck.

A single brake unit for braking two adjacent wheels on the same side of a railway car truck and retaining all the advantages of the "package" type brake unit, would substantially reduce the cost of the required number of brake units per truck and per car below the cost of providing an individual brake unit for each wheel.

Accordingly, it is the general purpose of this invention to provide a novel, small, lightweight and inexpensive "package" type brake unit for effecting simultaneously a brake application on two adjacent wheels on the same side of a railway car truck.

Essentially, the brake apparatus of the present invention comprises a novel "package" type brake unit which has a sectionalized casing or housing pivotally mounted on the side frame of a railway car truck adjacent one wheel of the truck, the housing including integral therewith a brake cylinder body. The pivotally mounted sectionalized housing encloses a fluid pressure operated brake actuating piston and lever mechanism for effecting movement of a first brake shoe into braking contact with the one wheel of the truck adjacent the sectionalized housing. The pivoted housing is connected by a tie rod to an actuating brake lever which in turn moves a second brake shoe into braking contact with a second wheel of the truck on the same side of the truck. The connection provided by the tie rod between the pivoted sectionalized housing and the actuating brake lever is made in such a manner that the reaction force on the housing resulting from a braking fluid pressure acting on the brake actuating piston to effect actuation of the first brake shoe into braking contact with the one wheel of the truck, is effective to rock the pivotally mounted casing and, through the intermediary of the tie rod and actuating brake lever, move the second brake shoe into braking contact with the second wheel of the truck on the same side of the truck. Embodied in the brake apparatus is a slack adjusting mechanism and a brake shoe spacing arrangement which cooperate to take up the slack resulting from the wearing away of the two brake shoes and to insure uniform clearance between each of the two brake shoes and its respectively associated wheel on the same side of the car truck when the brakes are released.

In the accompanying drawings:

FIG. 1 and FIG. 1A, taken together, is a vertical cross-section view of a two-wheel brake unit embodying the invention, showing the brake applying linkages, the slack adjuster mechanism and the brake shoe spacing arrangement.

Description

Figure 4:
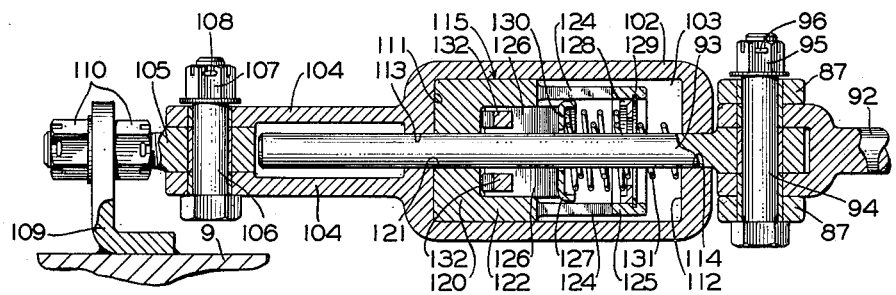
FIG. 4 is a cross-sectional view, taken along the line 4—4 of FIGS. 1 and 1A, and looking in the direction of the arows, showing further structural details of the brake shoe spacing arrangement.
Figure 5:
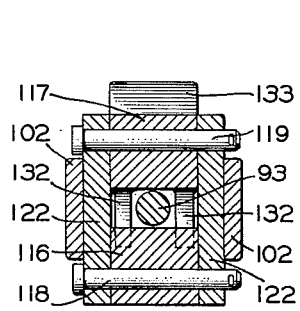
FIG. 5 is a cross-sectional view, taken along the line 5—5 of FIG. 1A and looking in the direction of the arrows, showing certain details of a clutch mechanism of the brake shoe spacing arrangement shown in FIG. 1A.

As shown in FIGS. 1, 1A, 2 and 3 of the drawings, a pneumatic brake unit 1, one of which is provided for each two adjacent wheels on one side of a two-axle four-wheel railway freight car truck, is pivotally mounted, as by a pair of pins 2, between the jaws 3 of a clevis formed at right angles to and at one end of an arm 4 which extends from one side of a bracket 5. The bracket 5 is secured, as by four bolts 6 and nuts 7, to a rectangular plate 8. The rectangular plate 8 in turn is disposed in an opening formed in a truck side frame 9 between the bolster opening and one of the journal box openings in the side frame and welded at its opposite ends respectively to the tension member and the compression member of the side frame.

Figure 1A:
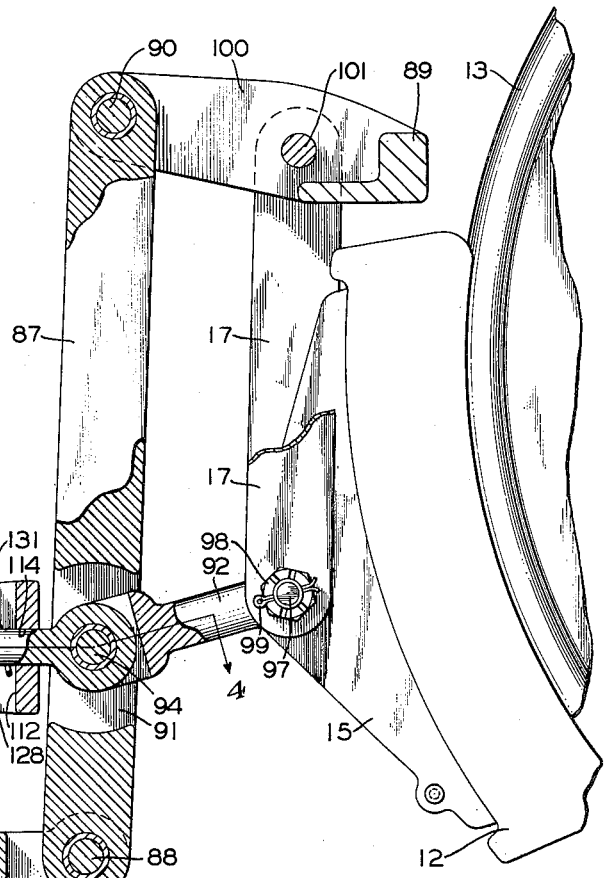

As shown in detail in FIGS. 1 and 1A, taken together, the brake unit 1 comprises a first brake shoe 10 for movement into braking contact with the tread of a first wheel 11 of the car truck, a second brake shoe 12 for movement into braking contact with the tread of a second wheel 13 located on the same side of the car truck as the wheel 11, a pair of brake heads 14 and 15 to which the brake shoes 10 and 12 are respectively secured, as by keys (not shown), a first pair of spaced-apart hangers 16 for the brake head 14, a second pair of spaced-apart hangers 17 for the brake head 15, and a three-part sectionalized casing or housing.

The sectionalized casing or housing comprises a main casing section 18, a cover section 18a and a brake cylinder casing section 19 formed integral with the main casing section 18. The sectionalized casing or housing is operatively connected through hereinafter described rods and levers to each of the pairs of the brake head hangers 16 and 17.

Formed integral with the main casing section 18 on opposite sides thereof (FIG. 2) are a pair of bosses 20 each provided with a bore 21 for receiving with a pressed fit one of a pair of identical bushings 22. Coaxial with each of the bushings 22 is a metallic inner sleeve 23 to which is bonded a resilient outer sleeve 24 of some suitable material, such as rubber. Each of the resilient outer sleeves 24 is disposed in a counterbore 25 in one of the jaws 3 of the arm 4. Each of the counterbores 25 is coaxial with a through bore in the respective jaw 3, the diameter of which bore is such as to permit the respective pins 2 to be inserted therethrough and pushed into the respective inner sleeves 23 and bushings 22 with which the respective pins have a turning fit to allow rocking of the main section 18 and the brake cylinder section 19 about these pins.

The brake cylinder casing section 19 is cylindrical in form and is provided with a bore 26 which opens at one end into the side wall of the main casing section 18. Slidably operable in the bore 26 in the brake cylinder casing section 19 is a fluid pressure actuated brake applying piston 27.

A release spring 28 is interposed between the piston 27 and a non-pressure head 29 that is secured to an inclined mounting surface formed partly on the main casing section 18 and partly on the brake cylinder casing section 19, as by a plurality of angularly spaced cap screws 30. The spring 28 serves to yieldingly bias the piston 27, and, through the rods and levers to be hereinafter described, the brake shoes 10 and 12 in a brake releasing direction to a brake release position, in which position they are shown in FIGS. 1 and 1A.

A packing cup 31 of the snap-on type is secured to the pressure face of piston 27. The packing cup 31 has a plurality of lugs 32 thereon, some of which, when piston 27 occupies its brake release position in which position it is shown in FIG. 1, contact a pressure head 33 which is formed integral with and closes the left-hand end of brake cylinder casing section 19. A pressure chamber 34 is thus formed between the pressure head 33 and piston 27 to which fluid under pressure may be supplied through a port 35 and a pipe 36. Pipe 36 may be connected by a flexible hose (not shown) to the brake cylinder pipe of a brake control valve of the usual air brake system on railway freight cars.

A bifurcated type of piston rod 37 that extends through the bore 26 into the chamber formed inside the main casing section 18 is connected at one end to the piston 27 by being formed integral therewith, and at the other end, as by a pair of pins 38, to a brake lever 39 adjacent one bifurcated end of the lever. The brake lever 39 is tapered for a portion of its length from the one end toward the opposite end (see FIG. 2) and provided at the large end of the tapered portion with a bore 40. A sleeve type bearing 41 is press fitted into the bore 40. A pair of oppositely arranged and inwardly facing bosses 42 and 43 are formed on the opposite walls of the main casing section 18, and provided with coaxial bores in each of which a bushing 44 is received. A bolt 45 extends through the bearing 41 and bushings 44 to permit rocking of lever 39 about the bolt 45. The bolt 45 is retained in place by a slotted nut 46 and a cotter key 47.

The above-mentioned opposite end of the lever 39 is provided with a pair of oppositely arranged and outwardly facing coaxial bosses 48 and 49 from which the lever 39 is tapered outward toward the bearing 41 carried therein. A bore 50 extends through the lever 39 and bosses 48 and 49 and has press-fitted therein a sleeve-type bearing 51. The opposite jaws 52 of a clevis formed at one end of a brake rod or link 53 are disposed adjacent to the bosses 48 and 49 and are provided with coaxial bores into each of which is press-fitted one of two identical bushings 54. A pin 55 extends with a turning fit through the bearing 51 and bushings 54 to provide an operative connection between the lever 39 and the one end of the brake rod 53.

Figure 3:
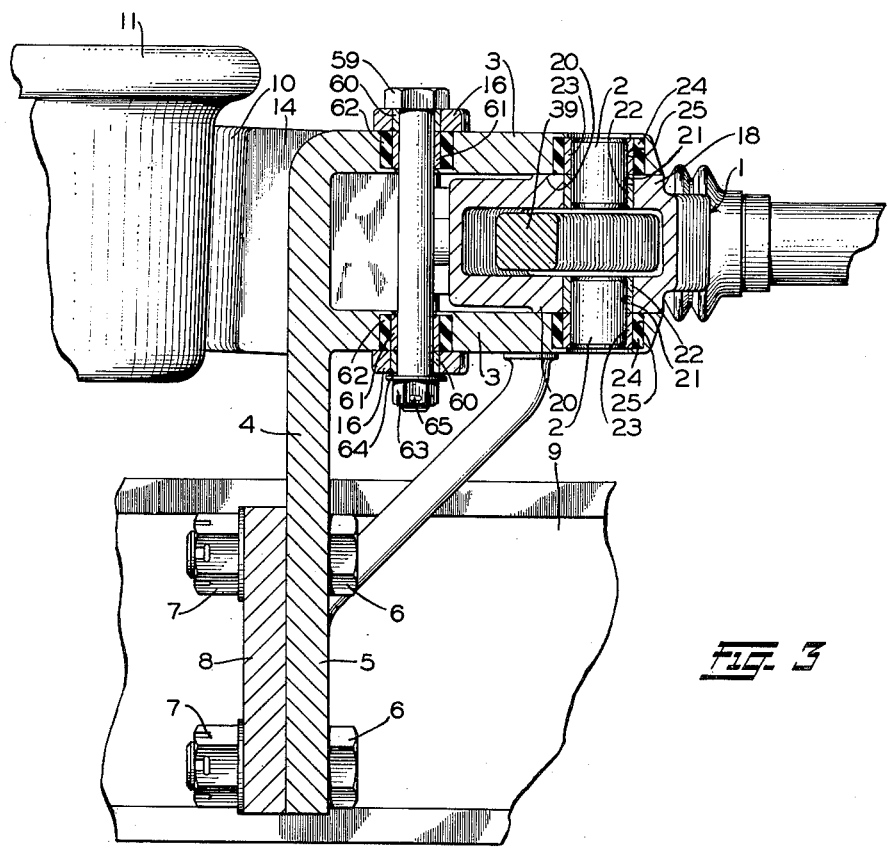
FIG. 3 is a cross-sectional view, taken along the line 3—3 of FIG. 1 and looking in the direction of the arrows, showing the manner by which the brake unit is mounted on a side frame of a railway freight car truck.

The other end of the brake rod 53 is pivotally connected to one end of the brake head hangers 16 and the brake head 14, as by a bolt 56. The bolt 56 is retained in place by a slotted nut 57 and a cotter key 58. The brake head hangers 16 consist of two identical, parallel links disposed respectively on the outside of the two jaws 3 (FIG. 3) of the clevis formed at one end of the arm 4 and suspended from the clevis, as by means of a bolt 59. Suitable anti-friction bushings 60 are disposed, as shown in FIG. 3, in a bore in each of the links comprising the brake head hangers 16. A pair of identical bushings, each comprising a metallic inner sleeve 61 to which is bonded a resilient outer sleeve 62 of some suitable material, such as rubber, are disposed one in each of two coaxial bores in the jaws 3. The bolt 59 is received within the bushings 60 in the links comprising the hangers 16 and the inner sleeves 61 and is secured against removal from the position in which it is shown in FIG. 3 as by a nut 63, washer 64 and cotter key 65. The outer resilient sleeves 62 and 24 allow the brake head hanger links 16 and the main casing section 18 to swing sidewise as the brake head 14 and brake shoe 10 are moved laterally the upper side of one pair of resilient sleeves and the lower side of the other pair of resilient sleeves being compressed as the links and casing section swing in one direction or the other in response to this lateral movement.

In order to provide, in customary fashion, for operation of the brakes by hand brake means, a pair of parallel spaced-apart lugs 66 (FIG. 1) are formed integral with the piston 27 and located between the bifurcations comprising the piston rod 37. Disposed between the lugs 66 and pivotally connected thereto, as by a pin 67, is a slotted link 68. The link 68 has a hollow flared portion 69 located at that end of the slot opposite the end in which the pin 67 is disposed. One end of a wire rope 70 is inserted through the hollow flared portion 69 after which this end of the rope is enlarged, as by depositing thereon and therearound molten metal from such as a welding rod. Upon cooling and solidification of the metal from such as the welding rod, the enlarged end of the wire rope 70 cannot be removed from the link 68. The free end of the wire rope 70 is connected through a system of levers, links and chains (not shown) to the hand brake wheel which is located at one end of the freight car.

In order that the brake shoe 15 may be actuated simultaneously with the brake shoe 14 and in an opposite direction, upon the supply of fluid under pressure to the chamber 34, the main casing section 18 is operatively connected to the brake head hangers 17, brake head 15 and brake shoe 12 through a linkage now to be described.

Figure 2:
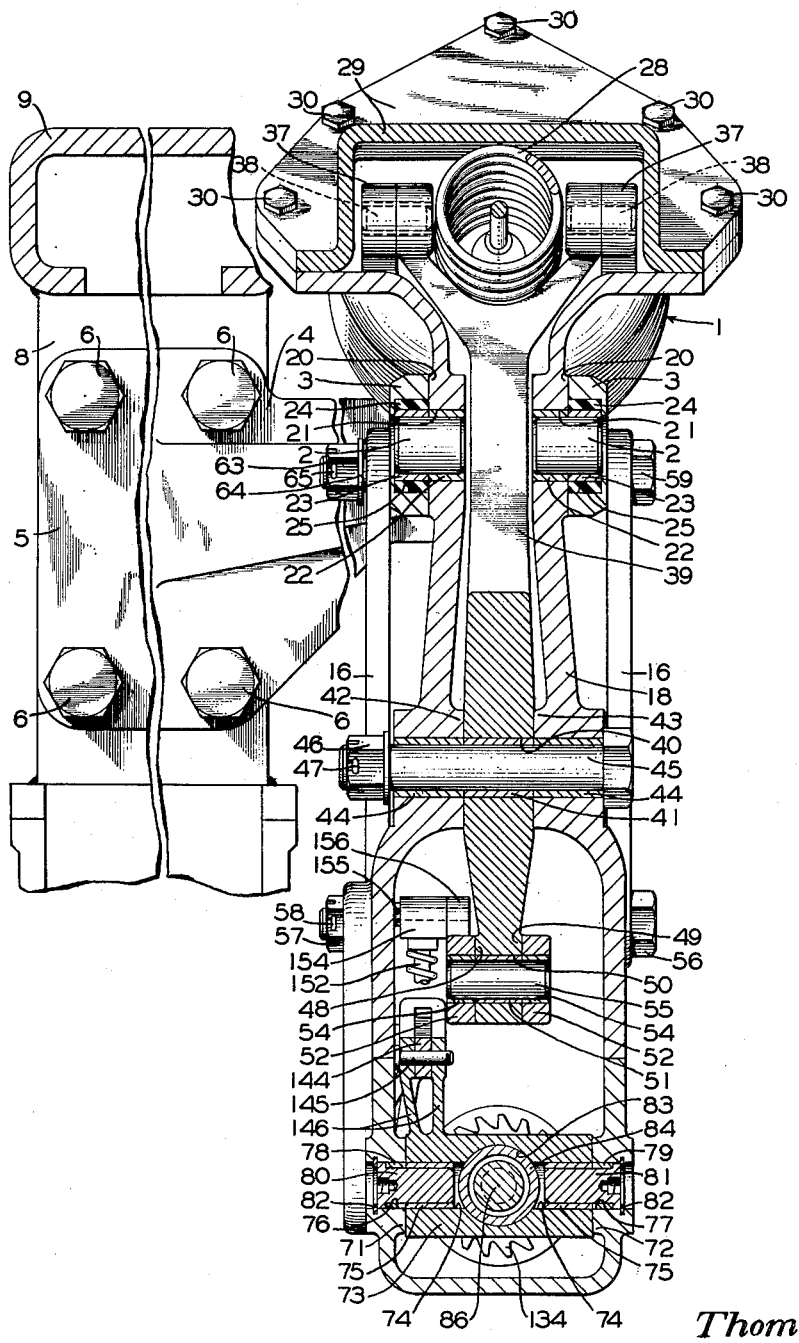
FIG. 2 is a cross-sectional view, taken along the line 2—2 of the brake unit of FIG. 1 and looking in the direction of the arrows, showing further structural details.

The two opposite walls of the lower end of the casing section 18, as shown in FIG. 2, respectively, have inward facing bosses 71 and 72. Disposed between the bosses 71 and 72 is a rectangular member 73 which has a through bore 74 (see FIG. 2), the outer ends of which each contain a short bushing 75. The bosses 71 and 72 are provided, respectively, with bores 76 and 77 coaxial with and having the same diameter as the bore 74. The bores 76 and 77 contain respectively, bushings 78 and 79 of the same inner and outer diameters as the bushings 75. The member 73 is pivotally connected to the main casing section 18 by a pair of identical pins 80 and 81 that extend respectively, into coaxial adjacent bushings 78 and 75 and bushings 79 and 75. One end of each of the pins 80 and 81 is provided with a collar which is disposed, respectively, between the outer ends of the bushings 78 and 79 and one of a pair of snap rings 82, each of which is inserted in a cooperating groove formed on the inside of the respective bores 76 and 77. Outward shifting of the pins 80 and 81 in their respective sets of bushings is limited by the respective snap rings 82 against which the collars on the respective pins 80 and 81 abut.

The member 73 is provided with a second bore 83, the axis of which intersects at right angles the axis of the bore 74. Arranged in the bore 83 with a turning fit is a hollow sleeve member 84 which is internally threaded adjacent one end, as shown in FIG. 1. Intermediate the ends thereof, the sleeve member 84 has a polygonal collar 85 against which abuts the right-hand end of member 73.

A rigid rod or link 86 threaded at one end has screw-threaded engagement with the internally threaded portion of the sleeve member 84. The other end of the rod 86 is provided with a clevis which is pivotally connected to one end of an actuating brake lever 87, as by a pin 88. The lever 87 is suspended from a clevis formed on a bracket 89, as by means of a pin 90. The bracket 89 is anchored to the truck side frame 9 by any suitable means (not shown). Intermediate its ends the lever 87 has a slot 91 and a bore which extends therethrough in intersecting relation to the slot. Disposed in the slot 91 is a clevis formed at one end of a brake rod 92 and arranged between the jaws of the clevis is an eye-end of a rod 93 which forms a part of a brake shoe spacing arrangement hereinafter described in detail. The rods 92 and 93 are pivotally connected to the lever 87, as by means of a bolt 94. Suitable anti-friction bushings are disposed, as shown in FIG. 4, in bores in the lever 87, the jaws of the clevis at one end of the brake rod 92 and the eye-end of rod 93. The bolt 94 is received within these bushings and is secured against removal from the position in which it is shown in FIG. 4 by a nut 95 and a cotter key 96.

The opposite end of the brake rod 92 is pivotally connected to one end of the brake head hangers 17 and the brake head 15, as by a bolt 97. The bolt 97 is retained in place by a slotted nut 98 and a cotter key 99. The brake head hangers 17 consist of a pair of identical, parallel links disposed respectively on the outside of two jaws 100, only one of which is shown in FIG. 1A, of the clevis formed integral with the bracket 89 and suspended from the clevis, as by means of a pin 101.

The above-mentioned brake shoe spacing arrangement comprises, in addition to the rod 93, as shown in FIGS. 1A and 4, a stationary member 102 having at one end a generally rectangular shaped slot 103 and at the opposite end a pair of jaws 104. An eye bolt 105 is placed between the jaws 104 and fastened thereto, as by means of a bolt 106, a nut 107 and a cotter key 108. The eye bolt 105 is also attached to an angle bracket 109, as by means of a pair of lock nuts 110, the angle bracket 109 in turn being affixed to the truck side frame 9, as by welding.

Two walls 111 and 112 located at the opposite ends of the slot 103 in the member 102 and arranged at right angles to the jaws 104 are provided, respectively, with coaxial bores 113 and 114 of equal diameter in which bores is slidably mounted that portion of the rod 93 to the left of the eye-end thereof, as shown in FIG. 4.

Mounted within the slot 103 is a clutch mechanism for clutching engagement and disengagement with the rod 93. This clutch mechanism comprises a slide member 115 slidably mounted in the slot 103 in the stationary member 102, a pair of locking pawls 116 and 117 pivotally mounted on the slide member, as by means of spaced-apart parallel pins 118 and 119, respectively, and biasing means for normally biasing the pawls into clutching engagement with the rod 93. The slide member 115 comprises a solid rectangular shaped portion 120 having a bore 121 through which passes the rod 93. At the right-hand side of the solid rectangular shaped portion 120, as shown in FIGS. 1A and 4, and formed integral therewith, is a hollow box-like rectangular portion 122, the short side of portion 122 being arranged at right angles to the long side of portion 120 and equal in length thereto. Formed integral with the hollow box-like rectangular portion 122 are two pair of spaced-apart bosses 123, a part of each of which extends to the left of the portion 122, as shown in FIG. 1A, and downward so as to merge into the portion 120. Each of the bosses 123 is provided with a bore to enable the pin 118 to be mounted in one pair of bosses 123 and the pin 119 in the other pair. The locking pawl 116, which is rockably mounted on the pin 118, is disposed between one pair of bosses 123. The locking pawl 117, which is rockably mounted on the pin 119, is disposed between the other pair of bosses 123.

Also formed integral with the hollow box-like rectangular portion 122 and extending from the right-hand side thereof, as shown in FIG. 1A, are four fingers 124 which are spaced apart to form the corners of a hollow generally box-like structure which serves to connect the portion 122 to a hollow square shaped portion 125.

In order to bias the pawls 116 and 117 into locking engagement with the rod 93, each of these pawls is provided with an arm 126 against the ends of which rest a first annular spring seat 127 which encircles the rod 92. A second annular spring seat 128, which also encircles the rod 93, is retained within the hollow square shaped portion 125 by means of a snap ring 129 which is inserted in a groove in the portion 125.

Disposed about the rod 93 and between the respective spring seats 127 and 128 is a first spring 130 which, through the intermediary of these spring seats and the arms 126, normally biases the pawls 116 and 117 into locking engagement with the rod 93. A second spring 131 arranged within the first spring 130 and about the rod 93, is disposed between the first spring seat 127 and the wall 112 of the slot 103. The spring 131 serves to normally yieldingly bias, through the clutch mechanism, and the rods 93 and 92, the brake head 15 and brake shoe 12 to a brake release position, in which position they are shown in FIG. 1A.

In order to manually operate the clutch mechanism to release the pawls 116 and 117 from the rod 93 when replacing a worn brake shoe 12 with a new shoe, the pawl 117 is provided with two spaced-apart fingers 132 arranged in straddling relation to the rod 93 and adjacent to the pawl 116, as shown in FIG. 1A, and a third finger 133 which is disposed adjacent to one side of the hollow box-like portion 122. By inserting a prying tool, such as a screw driver, between the finger 133 and the one side of the hollow box-like portion 122 and thereafter rocking the screw driver on the said one side as a fulcrum, the pawl 117 can be rotated counterclockwise about the pin 119, as viewed in FIG. 1A, whereupon the pawl 117 is lifted out of locking engagement with the rod 93. As the pawl 117 is rocked counterclockwise, as just explained, the fingers 132 are moved into contact with the pawl 116. Therefore, continued counterclockwise rocking of the pawl 117 will effect, through the intermediary of the fingers 132, clockwise rocking of the pawl 116, as viewed in FIG. 1A, about the pin 118 whereupon the pawl 116 is moved out of locking engagement with the rod 93. With the locking pawls 116 and 117 moved out of locking engagement with the rod 93, the brake head 15 can be swung on the hangers 17 until brake shoe 12 is in a position to provide the proper distance or clearance between the braking face of the shoe 12 and the tread of the wheel 13.

When the brake head 15 and brake shoe 12 have been moved to the desired position, as just explained, the prying tool may be removed from between the finger 133 and the one side of the hollow box-like portion 122, whereupon the spring 130 will, through the intermediary of the spring seats 127 and 128 and the arms 126, rock the pawls 116 and 117 into locking engagement with the rod 93. With the pawls 116 and 117 thus in locking engagement with the rod 93, the braking surface of the brake shoe 12 will be maintained at the correct distance from the tread of the wheel 13.

It is apparent from FIG. 1 that, as the braking surface of the brake shoe 10 wears away, the travel of the brake rod 53 in the direction of the left hand will increase upon each successive application of the brakes. Therefore, in order to maintain the same travel distance for the brake rod 53 and also the piston 27, and the brake cylinder casing section 19, in an opposite direction to that of the piston 27, upon each subsequent application of the brakes as the brake shoe 10 wears away, the brake unit 1 is provided with a slack take-up or adjuster mechanism which will now be described in detail.

The slack adjuster mechanism of the brake unit 1 shown in FIGS. 1 and 2 comprises, in addition to the hollow internally threaded sleeve 84 and externally threaded rod 86 which has screw-threaded engagement with the internally threaded portion of the sleeve 84, a ratchet wheel 134, a pawl 135, and a driving mechanism operatively connecting the pawl 135 to the brake lever 39.

The ratchet wheel 134 is made from three identical stampings which are spot-welded together and then placed on a hexagonal shaft formed on the left-hand end of the sleeve member 84 with the right-hand side thereof in abutting contact with a shoulder adjacent the left-hand end of the member 73. The end of the hexagonal shaft is threaded to receive a nut 136 and a dish-like washer 136a which serve to retain the ratchet wheel 134 on the sleeve member 84.

Figure 6:
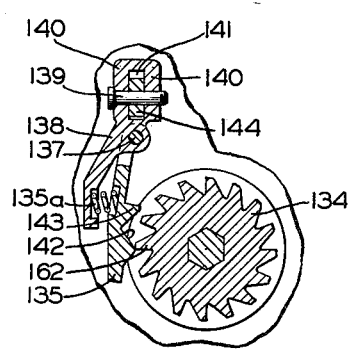
FIG. 6 is a fragmentary sectional view, taken along the line 6—6 of FIG. 1 and looking in the direction of the arrows, showing certain details of the pawl and ratchet wheel of FIG. 1.

The pawl 135, as shown in FIG. 6, is provided at one end with a clevis whereby it may be pivotally mounted on such as a pin 137 which is carried on a link 138 intermediate the ends thereof. The pawl 135 is biased in the direction of the ratchet wheel 134 by a spring 135a which is disposed between an arm formed integral with the link 138 and the pawl 135. The link 138 is in turn pivotally mounted at one end on a pin 139 which is carried in coaxial bores which extend through a pair of spaced-apart jaws 140 in intersecting relation to a slot 141 formed between the jaws 140. As shown in FIG. 6, the opposite end of the pawl 135 is provided with a cam surface 142 and a pawl tip 143.

Disposed between the jaws 140 and operatively connected to the link 138, as by means of the pin 139, is one end of a slack adjuster lever 144 which in turn is pivotally mounted, intermediate its ends, on a pin 145 which is carried in a pair of spaced-apart arms 146 which are formed integral with and extend upward from the left-hand end of member 73, as viewed in FIG. 2.

The opposite end of the slack adjuster lever 144 extends between the jaws of a clevis 147 which comprises one end of a resilient link 148 and is operatively connected thereto, as by means of a pin 149. The clevis 147 has a bore 150 and a coaxial counterbore 151, the axis of which is parallel to the jaws of the clevis and located midway therebetween. One end of a rod 152 extends through the bore 150 and counterbore 151 and is slidably retained therein as by means of a snap ring 153 inserted in a groove in the rod. The opposite end of the rod 152 is provided with a boss 154 having a bore in which is disposed with a turning fit, a bolt 155. The threaded end of the bolt 155 has screw-threaded engagement with a threaded bore in an angular arm 156 which is formed integral with the brake rod 53.

As shown in FIG. 1, a portion of the brake rod 53 and a portion of the rectangular member 73 extend through suitable openings in the respective cover section 18a and the right-hand wall of the main casing section 18 to the exterior thereof. In order to prevent the entrance of water, ice and dirt to the interior of casing section 18, a protective disc-type boot 157 constructed of some suitable material such as rubber and a protective sleeve-type boot or bellows 158, also constructed of some suitable material, such as rubber, respectively surround the respective openings. The bellows 158 and boot 157 are retained in place, respectively, by annular plates 159 and 160 which are secured to the respective casing section 18 and cover section 18a by a plurality of cap screws 161.

Operation

Let it be assumed that the chamber 34 in the brake cylinder casing section 19 is void of fluid under pressure and that the spring 28 has moved the piston 27 and the casing sections 18 and 19 to the position in which they are shown in FIG. 1 in which a lug 32 on the packing cup 31 contacts the pressure head 33. The piston 27, as it was moved in the direction of the left hand by the spring 28, effected, through the piston rod 37, counterclockwise rocking of brake lever 39 to move the brake head 14 and brake shoe 10 away from the wheel 11 to a brake release position in which they are shown in FIG. 1.

The casing section 18, as it was rocked clockwise about the pins 2 by the spring 28 acting on the non-pressure head 29, effected, through the rectangular member 73, which is pivotally connected by means of the pins 80 and 81 to the casing section 18, the sleeve member 84, and the rod 86, clockwise rocking of lever 87 and brake hangers 17, connected to the lever 87 by means of the brake rod 92, to move the brake head 15 and brake shoe 12 away from the wheel 13 to a brake release position in which they are shown in FIG. 1A.

In operation, when it is desired to effect a brake application, fluid under pressure is admitted to the pressure chamber 34 through the pipe 36 which is connected, by means of the flexible hose not shown, to the brake controlling valve device of the usual air brake system on railway feright cars. Fluid under pressure thus supplied to the chamber 34, formed between the piston 27 and the pressure head 33, is effective to move the piston 27 and piston rod 37 in the direction of the right hand under the yielding resistance of spring 28 and to rock the main casing section 18 and the brake cylinder section 19, which is integral therewith, counterclockwise about the pins 2.

As the piston 27 and piston rod 37 are moved in the direction of the right hand, the brake lever 39 is rocked clockwise, via the bearing 41, on the pin 45. Since the brake lever 39 is pivotally connected to the brake head hangers 16 and brake head 14 which carries the brake shoe 10 by means of brake rod 53, and bolts 55 and 56, clockwise rocking of brake lever 39 is effective to move the brake rod 53 in the direction of the left hand to bring the brake shoe 10 carried by the brake head 14 into braking contact with the wheel 11 to effect a braking action on the wheel 11.

As the brake head 14 and brake shoe 10 are moved as described above, these members are supported and guided by the brake head hangers 16 as these hangers are rocked about the bolt 59 carried by the jaws 3 of the bracket 4.

As the main casing section 18 and the brake cylinder casing section 19 are rocked counterclockwise about the pins 2, the lever 87 is also rocked counterclockwise about the pin 90, via the rod 86 which is operatively connected to the main casing section 18 and the lever 87. Since the lever 87 is pivotally connected to the brake head hangers 17 and brake head 15, which carries the brake shoe 12 by means of brake rod 92 and bolts 94 and 97, counterclockwise rocking of lever 87 is effective to move the brake rod 92 in the direction of the right hand to bring the brake shoe 12 carried by the brake head 15 into braking contact with the wheel 13 to effect a braking action on the wheel 13.

As the brake head 15 and brake shoe 12 are moved as described above, these members are supported and guided by the brake head hangers 17 and lever 87 as these hangers and the lever are rocked about the respective pins 101 and 90 carried by the jaws 100 of the clevis on the bracket 89. The orientation of the brake head hangers 17, brake rod 92, lever 87 and brake head 15 is such that the brake head 15 and brake shoe 12 carried thereby are moved radially toward the wheel 13.

As the brake rod 92 moves in the direction of the right hand, the rod 93 is carried therewith inasmuch as these rods are pivotally connected by means of the bolt 94. Because the locking pawls 116 and 117 are biased into locking engagement with the rod 93 through the intermediary of the spring 130, spring seats 127 and 128 and arms 126, the clutch mechanism including the slide member 115 is moved against the yielding resistance of the spring 131 in the direction of the right hand within the slot 103 simultaneously with the movement of the rods 92 and 93. The length of the slot 103 is just sufficient for the shot 12 to be brought into braking contact with the tread of wheel 13 without the right-hand side of the hollow square-shaped portion 125 abutting the wall 112 of the member 102.

When it is desired to release the brake application, the fluid under pressure supplied to the chamber 34 is vented in the usual manner to atmosphere through the pipe 36 under the control of the brake controlling valve device (not shown) of the freight car brake system, whereupon the force of spring 28 acting on the non-pressure head 29 moves the piston 27 and piston rod 37 in a brake releasing direction to effect counterclockwise rocking of brake lever 39 on bolt 45. Simultaneously, the force of the spring 28 acting on the piston 27 rocks the brake cylinder casing 19 and main casing section 18 integral therewith, clockwise about the pins 2.

The counterclockwise rocking of brake lever 39 about the bolt 45 is transmitted through the brake rod 53 to the brake head hangers 16 to effect counterclockwise rocking of brake head angers 16, brake head 14 and brake shoe 10 correspondingly away from the tread surface of the wheel 11.

The clockwise rocking of the casing sections 18 and 19 about the pins 2 is transmitted through the rod 86 to the lever 87 to effect corresponding clockwise rocking of this lever and, through the intermediary of the brake rod 92, the brake head hangers 17 to effect clockwise rocking of these hangers, the brake head 15 and brake shoe 12 away from the tread surface of the wheel 13 simultaneously with rocking of the hangers 16, brake head 14 and brake shoe 10 away from the tread surface of the wheel 11 to release the brake application.

As the lever 87 is rocked clockwise as explained above, the rod 93 is moved in the direction of the left hand, whereupon the force of the spring 131 acting through the intermediary of the spring seat 127, arms 126, pawls 116 and 117 and pins 118 and 119 moves the clutch mechanism in the direction of the left hand until the left-hand end of the rectangular-shaped portion 120 of the slide member 115 is moved into contact with the wall 111 at the left-hand end of the slot 103.

In operation, when the brake lever 39 is rocked in a clockwise direction about the bolt 45 in order to effect an application of the brakes, as explained above, the arm 156 formed integral with brake rod 53 is moved in the direction of the left hand (as viewed in FIG. 1).

At the same time the slack adjuster lever 144, through the intermediary of pin 149, resilient link 148 and bolt 155 which is carried by the arm 156, is rocked counterclockwise about pin 145 carried by the arm 146 to move the pawl 135 carried by link 138 on the pin 139 in a downward direction so that the pawl tip 143 (FIG. 6) slides downward on the back of a tooth 162 on the ratchet wheel 134, which ratchet wheel remains stationary under these conditions by reason of the fact that it is secured to the sleeve member 84 by the nut 136 and the sleeve member 84 carried in the rectangular member 73 at this time is being moved in the direction of the right hand by the main casing section 18. If the wear of brake shoe 10 does not exceed a predetermined amount, the pawl tip 143 will not be moved downward (as viewed in FIG. 6) a sufficient distance to engage with the next tooth on the ratchet wheel 134. Consequently, when the brakes are subsequently released under these conditions, the pawl 135 returns to its original position without effecting rotation of the ratchet wheel 134 since the spring 135a is effective to bias the pawl 135 in a counterclockwise direction about the pin 137 to maintain the pawl tip 143 in engagement with the end of the same tooth along which the pawl tip slides during a brake application.

Let it now be supposed that, due to repeated applications of the brakes, one or both of the brake shoes 10 and 12 are worn away an appreciable amount.

If, during a brake application, the brake shoe 10 wears away sufficiently for the pawl tip 143 to be moved downward until it reaches the end of the back of a tooth on the ratchet wheel 134, it will engage the next tooth on the ratchet wheel. With the pawl tip 143 now in engagement with the next tooth on the ratchet wheel, the pawl 135 will be effective to rotate the ratchet wheel and the sleeve member 84 as it moves upwardly upon a subsequent release of the brakes. Rotation of rod 86 is prevented by its connection to the lever 87 by the pin 88. Consequently, the screw-threaded sleeve member 84 is unscrewed from the screw-threaded portion of the rod 86, thus rocking the main casing section 18 clockwise about the pins 2 for the reason that the sleeve member 84 is rotatably carried within the bore 83 in the member 73 which is pivotally connected to the main casing section 18 by means of the pins 80 and 81.

Inasmuch as the brake lever 39 is pivotally mounted on the bolt 45 which is carried by the main casing section 18, the brake lever 39 is effective through the intermediary of the pin 55 and bolt 56 and the brake rod 53 to move the brake shoe 10 in the direction of the wheel 11 and take up the slack occurring as a result of the wearing away of the brake shoe 10 as the main casing section 18 is rocked clockwise about the pins 2.

From the above, it is apparent that as the brake shoe 10 wears away, the brake rod 53, and consequently the brake shoe 10, are moved radially in the direction of the wheel 11 to always maintain a substantial uniform clearance between the tread of the wheel 11 and the braking surface of the brake shoe 10 when the brake shoe occupies its brake release position.

Let it now be supposed that, while a brake application is in effect, the brake shoe 12 wears away. At this time the brake shoe 10 may or may not wear away simultaneously therewith. If the brake shoe 10 wears away simultaneously with the shoe 12, the slack adjuster mechanism operates, as hereinbefore described, to unscrew the sleeve member 84 from the screw-threaded portion of the rod 86 to effect movement of the shoe 10 toward the wheel 11.

When a brake application is made, as hereinbefore explained, the length of the slot 103 in the member 102 is just sufficient for the shoe 12 to be brought into braking contact with the tread of the wheel 13 without the right-hand side of the hollow square-shaped portion 125 abutting the wall 112 of the member 102. Consequently, when the shoe 12 begins to wear away, the fluid under pressure present in the chamber 34 becomes effective to rock the main casing section 18 counterclockwise about the pins 2 to, through the intermediary of the rod 86, rock the lever 87 counterclockwise about the pin 90. The counterclockise rocking of the lever 87, through the intermediary of the bolts 97 and 94 and the brake rod 92, is effective to move the brake shoe 12 radially in the direction of the wheel 13 to maintain the braking surface of the shoe 12 in braking contact with the tread of the wheel as the brake shoe wears away.

Since the brake rod 92 is pivotally connected to the rod 93 by means of the pin 94, the rod 93 and the clutch mechanism of the brake shoe spacing arrangement, acting in cooperation with the slack adjuster mechanism and in response to brake shoe wear are moved in the direction of the right hand simultaneously with the brake rod 92 as the brake shoe 12 wears away. Accordingly, as the brake shoe 12 begins to wear away, the hollow square-shaped portion 125 of the clutch mechanism is moved against the yielding resistance of spring 131 into contact with the wall 112 located at the right-hand end of the slot 103 in the member 102 to terminate movement of the clutch mechanism in the direction of the right hand.

As the brake shoe 12 continues to wear away subsequent to termination of movement of the clutch mechanism, the lever 87 will be further rocked in a counterclockwise direction to maintain the braking surface of the brake shoe 12 in contact with the tread of the wheel 13. Therefore, the lever 87 will exert, through the pin 94, a pull on the rod 93 to cause this rod to be pulled through the locking pawls 116 and 117 which, at this time, are yieldingly biased by the spring 130, through the intermediary of spring seats 127 and 128 and arms 126, into gripping contact with the rod 93. Hence, simultaneously with the wearing away of the shoe 12, the rod 93 is moved in the direction of the right hand, as viewed in FIG. 1A, to increase the distance between the parallel axes of the bolts 94 and 106 (FIG. 4).

Since the locking pawls 116 and 117 are biased by the spring 130 in a direction to make a gripping contact with the rod 93, upon the release of the brakes, the spring 130 will be effective to lock these pawls to the rod 93 and prevent movement of the rod 93 with respect to the pawls. Consequently, when the release spring 131 has moved the clutch mechanism in the direction of the left hand until the left-hand side of the rectangular-shaped portion 120 has contacted the wall 111 at the left-hand end of the slot 103 in the member 102, the braking surface of the brake shoe 12 will be the same distance from the tread of the wheel 13 as it was prior to the wearing away of the shoe.

When the brake shoes 10 and 12 have completely worn out and they are replaced by new shoes, it is necessary to reduce the length of the rods 86 and 93. If only one shoe has worn out, the rod to be reduced in length depends on which of the two shoes has worn out.

Let it be first supposed that only the brake shoe 12 has worn out and is replaced with a new shoe. After replacing the worn shoe 12 with a new shoe, in order to provide the proper distance between the braking surface of the new shoe and the tread of the wheel 13 when the brakes are released, a prying tool, such as a screw driver, is inserted between the finger 133 on the locking pawl 117 and the hollow box-like portion 122. By means of the prying tool the pawl 117 is rocked counterclockwise about the pin 119 to move the arm 126 on the pawl 117 out of locking engagement with the rod 93. As the pawl 117 is thus rocked counterclockwise about the pin 119, the fingers 132 on the pawl 117 are brought into contact with the pawl 116 to thereafter effect clockwise rocking of the pawl 116 about the pin 118 to move the arm 126 on the pawl 118 out of locking engagement with the rod 93.

After the arms 126 of the respective pawls 116 and 117 have been moved out of locking engagement with the rod 93, the lever 87 and brake head hangers 17 can be manually rocked about their respective pivot pins 90 and 101 until the desired distance between the braking surface of the new brake shoe 12 and the tread of the wheel 13 has been obtained. When the new brake shoe 12 has been moved to the desired position with respect to the wheel 13, the prying tool can be withdrawn from between the finger 133 and the hollow box-like portion 122 whereupon the spring 130 will move the arms 126 of the respective pawls 116 and 117 into locking engagement with the rod 93. The new brake shoe 12 will now be maintained in its adjusted position until a brake application is made.

When the lever 87 is manually rocked about the pin 90 to adjust the position of the new brake shoe 12 as just explained, this movement is transmitted through the rod 86 to rock the main casing section 18 about the pins 2. Because of the fact that the bolt 45 upon which the brake lever 39 is pivotally mounted is carried by the main casing section 18, the rocking movement transmitted to the main casing section 18 through the rod 86 is in turn transmitted through the brake lever 39 and brake rod 53 to the brake head hangers 16 and brake head 14 to change the distance between the braking surface of the brake shoe 10 and the tread of the wheel 11. Therefore, in order to restore the brake shoe 10 to its original position with respect to the wheel 11, it is necessary to apply a wrench to the polygonal collar 85 on the hollow sleeve member 84 and to rotate this member. Since the rod 86, with which the sleeve member 84 has screw-threaded engagement, is pivotally connected to the lever 87 by means of the pin 88, the rod 86 cannot rotate with the sleeve member. Consequently, the sleeve member 84 is advanced along the screw-threaded portion of the rod 86 and this movement is effective to rock the casing section 18 about the pins 2 to move the brake shoe 10 to a position in which the proper distance between the braking surface of the shoe and the tread of the wheel 11 is obtained.

Let it now be supposed that only the brake shoe 10 has worn out and is replaced with a new shoe. After replacing the worn shoe 12 with a new shoe, the proper distance between the braking surface of this new shoe and the tread surface of the wheel 11 can be obtained by applying a wrench to the polygonal-sided collar 85 and rotating the sleeve member 84 in the manner hereinbefore explained.

If both of the brake shoes 10 and 12 are replaced by new shoes, the proper distance between the braking surface of each shoe and its respective wheel can be obtained in the manner hereinbefore explained for each shoe provided the adjustment for the new shoe 12 is made first. It is necessary that the adjustment for the shoe 12 be made first since this adjustment involves rocking the lever 87 about the pin 90 which rocking in turn is transmitted through the rod 86 and the casing section 18 to change the position of the shoe 10 with respect to the wheel 11.

It should be noted that, as heretofore well known in slack adjuster mechanisms, the pawl 135 and its cam surface 142 are of such shape and size that, incidental to a release of the brakes, this cam surface engages a tooth (FIG. 6) on the ratchet wheel 134 prior to the pawl 135 reaching its normal or release position corresponding to the brake release position of the brake shoe 10. After this engagement occurs, this tooth is effective, as the pawl continues its upward movement toward its release position, to rock the pawl 135 clockwise, as viewed in FIG. 6, about the pin 137 so that upon the pawl reaching its release position the pawl tip 143 will have been moved to the position in which it is shown in FIG. 6, in which position the ratchet wheel 134 is free to rotate in a counterclockwise direction when the sleeve member 84 is manually rotated by a wrench applied to the polygonal-sided collar 85 on the sleeve member.

When, in the absence of fluid under pressure in brake cylinder chamber 34, it is desired to effect a brake application manually, a trainman will manually rotate the hand brake wheel in the proper direction to apply the brakes. As the trainman applies a manual force to the hand brake wheel to rotate it, this force is transmitted through the system of chains, links and levers to the wire rope 70 to exert a pull thereon in the direction of the right hand, as viewed in FIG. 1 of the drawings. The force thus exerted on the wire rope 70 is transmitted through the link 68 and lugs 66 to the piston 27 to pull the piston in the direction of the right hand as viewed in FIG. 1. This movement of the piston 27 is transmitted through the spring 28, which is interposed between the piston and the non-pressure head 29 secured to the main casing section 18 and the brake cylinder casing section 19 by the cap screws 30, to the main casing section 18 to rock it clockwise about the pins 2 carried in the jaws 3 of arm 4.

The bolt 45 which is carried by the main casing section 18 is therefore rotated clockwise about the pins 2 as the casing section 18 is rocked clockwise about these pins. The brake lever 39 is pivotally mounted on the pin 45 and is operatively connected to the brake hangers 16 and brake head 14 through the intermediary of the brake rod 53, pin 55 and bolt 56. Therefore, it is evident that, as the bolt 45 is rotated clockwise about the pins 2, the brake lever 39, which is pivotally mounted on the bolt 45, and the brake rod 53 are effective to rock the brake hangers 16 clockwise about the bolt 59 and thereby move the brake head 14 and brake shoe 10 in the direction of the tread of the wheel 11 until the braking surface of the brake shoe 10 contacts the tread of the wheel 11.

After the braking surface of the brake shoe 10 contacts the tread of the wheel 11, further clockwise rocking of the brake hangers 16 about the bolt 59 and clockwise rocking of the main casing section 18 about the pins 2 is prevented. Therefore, as the trainman continues to rotate the hand brake wheel and thereby exert a force through the wire rope 70 to pull the piston 27 in the direction of the right hand against the yielding resistance of spring 28, this force will be transmitted through the bifurcated type piston rod 37 and the pins 38 to the brake lever 39 to cause this lever to fulcrum on the pin 55 and rotate clockwise about this pin.

As the brake lever 39 is now rocked clockwise about the pin 55, as a result of continued manual rotation of the hand brake wheel by the trainman, the bolt 45, by which the brake lever 39 is pivotally mounted on the main casing section 18, is also shifted in an arc clockwise about the pin 55. Since the bolt 45 is carried by the main casing section 18, the casing section must necessarily rock correspondingly with the bolt about the pins 2 since the main casing section 18 is pivotally mounted on these pins. Therefore, as the bolt 45 shifts clockwise about the pin 55, it is effective to cause the main casing section 18 to be likewise rocked counterclockwise about the pins 2.

As the main casing section 18 is rocked counterclockwise about pins 2, as explained above, it is effective through the rods 86 and 92 to effect counterclockwise rocking of the lever 87 and brake hangers 17, respectively, about the pin 90 and pin 101 and move the brake head 15 and brake shoe 12 in the direction of the tread of the wheel 13 until the braking surface of the shoe 12 contacts the tread of the wheel 13.

After the braking surface of the brake shoes 10 and 12 are moved into contact with the treads of their respective wheels 11 and 13, as has been explained, the force transmitted to these shoes, as the trainman continues to exert a manual force on the hand brake wheel, is effective to cause a brake application on these wheels of the railway car truck. It will be understood that the cable 70 of the brake unit on one side of a car truck may be actuated alone or it may be actuated simultaneously with a similar cable 70 for the brake unit on the opposite side of the car truck. Thus, the hand brake operation may apply the brakes on only the two wheels on one side of the car truck or on all four wheels simultaneously.

Having now described the invention, what we claim as new and desire to secure by Letters Patent, is:

1. A brake unit for applying a braking force to two wheels on the same side of a railway car truck having a pair of side frames, said unit comprising a vertically disposed casing having a chamber therein, a first pivot means pivotally mounting said casing on one of the side frames of the truck, a brake cylinder portion forming a part of said casing, said brake cylinder portion being disposed above said pivot means and having a piston operable in a bore therein that opens into the chamber in the casing, two brake shoes, one for each of the two wheels on the same side of the truck, means carried by the said one side frame for movably supporting each of said brake shoes, a link operatively connected at one end to said casing and at the opposite end to one of said two brake shoes, and a substantially vertically disposed brake lever, carried entirely within said casing, a second pivot means rockably mounting said brake lever on said casing, at a point below said first pivot means, said brake lever being operatively connected at its lower end below said second pivot means to the other of said two brake shoes and at its upper end above said first pivot means to said brake cylinder piston whereby movement of said brake shoes into and out of braking contact with the tread surface of the corresponding car wheels is effected by rocking movement of said brake lever and said casing in opposite directions responsively to supply of pneumatic pressure to and subsequent release of pneumatic pressure from said brake cylinder piston respectively.

2. The brake unit as defined in claim 1, further characterized in that the means for supporting the other of said two brake shoes comprises two separate hanger links pivotally connected at their lower ends to the other of said two brake shoes, and a third pivot means for pivotally supporting said two separate hanger links at their upper ends at a point substantially on a horizontal level with said first pivot means.

3. A brake unit for applying a braking force to two wheels on the same side of a railway car truck having a pair of side frames, said unit comprising a casing having a chamber therein and pivotally mounted on one of the side frames of the truck, a brake cylinder portion forming a part of said casing and having a piston operable in a bore therein that opens into the chamber in the casing, two brake shoes, one for each of the two wheels on the same side of the truck, two brake heads, each carrying one of said brake shoes, means carried by the one side frame for movably supporting each of said brake heads, a rigid rod movably mounted within the chamber of said casing for axial movement substantially in a straight line, one end of said rigid rod extending exteriorly of said casing and being operatively connected to one of said brake heads, link means operatively connected at one end to said casing and at the opposite end to the other of said brake heads, said link means comprising a screw member and an internally threaded sleeve member in which the screw member is received, a brake lever disposed entirely within and rockably mounted on said casing, means operably connecting one end of said brake lever to said piston, means operatively connecting the opposite end of said brake lever to the portion of said rigid rod within said chamber whereby relative rocking movement between said brake lever and said casing responsive to the supply of pneumatic pressure to one side of said piston and subsequent release of pneumatic pressure therefrom effects movement of said brake shoes into and out of braking contact with the tread surface of the corresponding car wheels, a ratchet wheel mounted on said sleeve member for rotation therewith, operating means for rotating said ratchet wheel and means operatively connecting said rigid rod to said operating means whereby relative rocking movement between said brake lever and said casing through greater than a chosen angle as a result of wear of said brake shoes effects operation of said operating means to rotate said ratchet wheel and thereby said sleeve member relative to said screw member to vary the length of said link to move said brake heads and brake shoes carried thereby toward their respective wheels.

4. A brake unit for applying a braking force to two wheels on the same side of a railway car truck having a pair of side frames, said unit comprising a casing having a chamber therein and pivotally mounted on one of the side frames of the truck, a brake cylinder portion forming a part of said casing and having a piston operable in a bore therein that opens into the chamber in the casing, two brake shoes, one for each of the two wheels on the same side of the truck, two brake heads, each carrying one of said brake shoes, means carried by the one side frame for movably supporting each of said brake heads, a rigid rod movably mounted within the chamber of said casing for axial movement substantially in a straight line, one end of said rigid rod extending exteriorly of said casing and being operatively connected to one of said brake heads, link means operatively connected at one end to said casing and at the opposite end to the other of said brake heads, said link means comprising a screw member and an internally threaded sleeve member in which the screw member is received, a brake lever disposed entirely within and rockably mounted on said casing, means operably connecting one end of said brake lever to said piston, means operatively connecting the opposite end of said brake lever to the portion of said rigid rod within said chamber whereby relatively rocking movement between said brake lever and said casing responsive to the supply of pneumatic pressure to one side of said piston and subsequent release of pneumatic pressure therefrom effects movement of said brake shoes into and out of braking contact with the tread surface of the corresponding car wheels, a ratchet wheel mounted on said sleeve member for rotation therewith, operating means for rotating said ratchet wheel, means operatively connecting said rigid rod to said operating means whereby relative rocking movement between said brake lever and said casing through greater than a chosen angle as result of wear of said brake shoes effects operation of said operating means to rotate said ratchet wheel and thereby said sleeve member relative to said screw member to vary the length of said link to move said brake heads and brake shoes carried thereby toward their respective wheels, and brake shoe spacing means operatively connected to the other of said brake heads and operative, at one time, by the rocking movement of said casing in one direction through said angle greater than said chosen angle, as a result of wear of the brake shoe carried by said other brake head, independently of the rotation of said sleeve member relative to said screw member as a result of wear of the brake shoe carried by said one brake head, and operative, at another time, jointly by the rocking movement of said casing in said one direction through said greater angle and the simultaneous rotation of said sleeve member relative to said screw member as a result of wear of both of said brake shoes occurring at the same time to adjust the travel of the brake shoe carried by said other brake head.

5. A brake unit as defined in claim 4, further characterized in that the brake shoe spacing means comprises a rod member operatively connected to said other brake head and a member fixed to the side frame in which fixed member the rod member is received, and further comprising a clutch mechanism for effecting a yieldable clutching engagement between said rod member and said fixed member to vary the effective length of said rod member whereby to adjust the travel of the brake shoe carried by said other brake head to effect contact with the tread surface of the corresponding car wheel to a desired uniform amount, as wear of said brake shoe occurs.

6. A brake unit as defined in claim 4, further characterized in that the brake shoe spacing means comprises a rod member operatively connected to said other brake head and a member fixed to the side frame in which fixed member the rod member is received, and further including yieldable clutching means having a pair of locking pawls for so connecting the rod member to the fixed member as to effect movement of the rod member relative to the fixed member in response to rocking of said casing through more than a certain angle in a brake applying direction as a result of wear of the brake shoe carried by said other brake head, and to effect a clutching relationship between said rod member and said stationary member in response to subsequent rocking of said casing in a brake releasing direction.

7. A brake unit for applying a braking force to two wheels on the same side of a railway car truck having a pair of side frames, said unit comprising a supporting housing having a chamber therein, a first pivot means pivotally mounting said housing on one of the side frames of the truck, a brake cylinder portion forming a part of said housing and having a piston operable in a bore therein that opens into the chamber in the housing, two brake shoes, one for each of the two wheels on the same side of the truck, two brake heads each carrying one of said brake shoes, means carried by the one side frame for movably supporting each of said brake heads, a rigid rod movably mounted within the chamber of said housing for axial movement substantially in a straight line, one end of said rigid rod extending exteriorly of said housing and being operatively connected to one of said brake heads, link means comprising two parts one of which is a screw member operatively connected to the other of said brake heads and the other of which is an internally threaded sleeve member in which the screw member is received, said sleeve member being operatively connected to said housing, a substantially vertically disposed brake lever carried entirely within said housing, a second pivot means rockably mounting said brake lever on said housing at a point below said first pivot means, said brake lever being operatively connected at its lower end below said second pivot means to the other end of said rigid rod and at its upper end above said first pivot means to said brake cylinder piston whereby movement of said brake shoes into and out of braking contact with the tread surface of the corresponding car wheels is effected by rocking movement of said brake lever and said housing in opposite directions by the forces acting thereon in response to the supply of pneumatic pressure to and subsequent release of pneumatic pressure from one side of said piston respectively, and means operated by movement of said brake lever exceeding a certain amount for effecting relative rotational movement of the screw member and sleeve member to vary the length of said link means whereby to adjust the travel of the brake shoes to effect contact with the tread surface of the two car wheels on the same side of the truck to a desired uniform amount, as wear of the brake shoes occurs.

8. In a brake apparatus for a railway vehicle truck having a side frame, a plurality of wheels, a brake shoe, a brake head for carrying said brake shoe, means movably supporting said brake head and brake shoe for movement toward and away from one of the wheels, and a brake actuating lever pivotally mounted on said side frame and movable to move said brake shoe into contact with said one wheel and away from said one wheel, the combination therewith of a brake shoe spacing means, said brake shoe spacing means comprising a rod operatively connected to said brake actuating lever, a first member pivoted to said side frame, a second member carried by and movable a limited amount relative to said first member, a pair of locking pawls, pivotally mounted on said second member, and a spring for biasing said locking pawls into gripping contact with said rod, said rod being movable with respect to said spring biased locking pawls subsequent to the limited movement of said second member relative to said first member by the rocking movement of said brake actuating lever in one direction through greater than a certain angle as a result of wear of said brake shoe to thereby provide a uniform clearance between said brake shoe and said one wheel corresponding to the limited relative movement between said second member and said first member.

9. In a brake apparatus for a railway vehicle truck having a truck frame, a plurality of wheels, a brake shoe for one of said wheels, a brake head for carrying said brake shoe, means movably supporting said brake head and brake shoe for movement toward and away from said one wheel, and a brake actuating lever for moving said brake head toward and away from said one wheel, the combination therewith of a brake shoe spacing means, said brake shoe spacing means comprising a releasable clutch mechanism connected between said vehicle truck frame and said brake head, said clutch mechanism comprising a rod operatively connected to said brake head for movement therewith by said brake actuating lever, a first member having at one end a slot of a chosen length and being pivotally connected at its other end to said vehicle truck, a second member slidably mounted in said slot between the ends thereof for limited movement with respect to said first member, a pair of locking pawls, a pair of pivot pins carried by said second member each pivotally mounting one of said locking pawls on said second member, a first spring means carried by said second member for yieldingly biasing said locking pawls into contact with said rod, a second spring means interposed between said second member and one end of said slot effective to bias said second member in the direction of the other end of said slot, said first and second spring means cooperating to provide a limited simultaneous movement of said second member, said locking pawls and said rod in response to rocking movement of said brake actuating lever in one direction through a certain angle and additional movement of only said rod with respect to said second member and said locking pawls carried thereby in response to rocking movement of said brake actuating lever in said one direction through an angle greater than said certain angle, and a manually operable lever integral with one of said locking pawls operable to rock both of said locking pawls about their respective pivot pins to release said pawls from said rod.

References Cited in the file of this patent

UNITED STATES PATENTS

| | | |
|---|---|---|
| 1,386,853 | Elliott | Aug. 9, 1921 |
| 2,174,398 | Farmer | Sept. 26, 1939 |
| 2,561,454 | Williams | July 24, 1951 |
| 2,888,104 | Frayer | May 26, 1959 |
| 2,940,554 | Cameron | June 14, 1960 |